UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING INSECTICIDES.

1,417,232. Specification of Letters Patent. Patented May 23, 1922.

No Drawing. Application filed February 6, 1919, Serial No. 275,450. Renewed October 24, 1921. Serial No. 510,100.

*To all whom it may concern:*

Be it known that I, HERBERT H. DOW, a citizen of the United States, and a resident of Midland, county of Midland, and State of Michigan, have invented a new and useful Improvement in Methods of Making Insecticides, of which the following is a specification, the principle of the invention being herein explained and the best mode in which I have contemplated applying that principle, so as to distinguish it from other inventions.

It is well known that lead arsenate, both the ortho-arsenate, $Pb_3(AsO_4)_2$, and the acid arsenate, $PbHAsO_4$, as well as the intermediate substance which may be regarded either as a mixture of the foregoing ortho- and acid arsenates, constitute a very efficacious insecticide for combatting many forms of insect pests. Some difficulty, however, has been encountered in the manufacture of such lead arsenates, on a commercial scale, in the elimination of the arsenic, for unless the freshly precipitated arsenate be thoroughly washed, sufficient traces of the acid will be carried over into the product to render the same harmful. Particularly where the lead arsenate is made by directly reacting between arsenic acid and lead monoxid, as described and claimed in U. S. Patent No. 1,228,516 to E. O. Barstow and J. A. Cavanagh, dated June 5, 1917, wherein it is necessary, in order to facilitate the reaction, that an excess of arsenic acid be employed the subsequent elimination of such acid from the product involves annoyance and expense.

According to the present invention, I propose, instead of thus eliminating any residual or excess arsenic acid, to take up the same with a suitable and relatively active basic material, as for example with calcium or magnesium hydrate. The calcium or magnesium arsenate thus formed possesses an insecticidal value in itself, and it is not necessary to gauge the amounts used exactly to the arsenic acid remaining unacted upon by the lead compound, since an excess of either such hydrate, and particularly of the magnesium hydrate, adds to the resulting composition certain desirable characteristics for insecticidal use.

The invention, then, consists of the novel step or steps hereinafter described as adapted for the formation of the foregoing insecticidal compound, it being understood, however, as to such stated method of manufacture, that changes may be made therein without departing from the spirit of the invention.

The direct reaction between lead oxide and arsenic acid to produce the acid arsenate of lead may be represented by the following equation, viz:—

$$PbO + H_3AsO_4 = PbHAsO_4 + H_2O.$$

Another known method for making the same arsenate consists in reacting between lead acetate and arsenic acid in accordance with the following typical reaction, viz:—

$$Pb(C_2H_3O_2)_2 + H_3AsO_4 = PbHAsO_4 + 2HC_2H_3O_2.$$

As previously indicated, whether the lead arsenate be formed by the foregoing or other reactions, in which arsenic acid is used as one of the reagents, or as a result of which such acid is apt to be set free, it has heretofore been necessary to thoroughly wash the precipitated arsenate in order to eliminate such arsenic acid as completely as possible, very small amounts being considered detrimental. According to my present invention, however, such precipitate, preferably while in the form of a sludge, i. e. before being finally filtered, is mixed with a suitable quantity of calcium hydrate, $Ca(OH)_2$, or magnesium hydrate, $Mg(OH)_2$. I incline to the use of the latter, since the resulting magnesium arsenate is a better insecticide than the calcium arsenate. Barium hydrate, $Ba(OH)_2$, may also be employed, these compounds being herein referred to inclusively as alkaline earth metal hydrates, and the compounds resulting from the reaction with arsenic acid as the alkaline earth metal arsenates. Where magnesium hydrate is employed the reaction that occurs may be represented by the following equation, viz:—

$$Mg(OH)_2 + H_3AsO_4 = MgHAsO_4 + 2H_2O.$$

By determining the degree of acidity of the lead arsenate precipitate, it can be readily calculated how much of such hydrate will be required to neutralize the excess acid, and the amount of the latter can be purposely left much larger than if it were desired to make merely lead arsenate. In other words, the amount of magnesium arsenate in the final product may equal that of the lead arsenate present. Moreover, as previously indicated, I have found it advantageous to use the hydrate in such quantity as to leave an excess of the latter over that required to take up the acid in the lead arsenate precipitate; for example, such hydrate may be present as such to the extent of one-fifth by weight (dry) of the finished product.

The mixture of lead and magnesium (or other alkaline earth metal) arsenates, with addition of hydrate of such last mentioned metal, may be then reduced to the form of a paste by filtering either with a centrifuge or filter press, or the cake, with as much water extracted therefrom as possible, may thereupon be dried and the material reduced to a powder in any suitable form of mill or pulverizing machine. Preferably the pulverizing machine or disintegrator of the type in which stationary and revolving diaphragms are employed will be used. The powder thus obtained is of slow settling character and forms an admirable spray mixture when added to the proper amount of water and agitated, or it may be used as a dust with any suitable form of apparatus, just as in the case of dry or powdered lead arsenate.

Other modes of applying the principle of my invention may be employed instead of the one explained, change being made as regards the method herein disclosed, provided the steps stated by any of the following claims or the equivalent of such stated steps be employed.

I therefore particularly point out and distinctly claim as my invention:—

1. The method of making an insecticide, which consists in reacting between a suitable lead compound and an excess of arsenic acid and neutralizing the residual acid with an excess of an alkaline earth hydroxide.

2. The method of making an insecticide, which consists in reacting between a suitable lead compound and an excess of arsenic acid and then admixing magnesium hydrate with the resulting lead arsenate in an amount slightly more than sufficient to neutralize the residual acid present.

3. The method of making an insecticide which consists in reacting between a suitable lead salt and an excess of arsenic acid, and neutralizing the residual acid with an alkaline earth hydroxide, the amount of alkaline earth arsenate in the resultant product being smaller than of lead arsenate.

4. The method of making an insecticide which consists in reacting between a suitable lead salt and an excess of arsenic acid, and neutralizing the residual acid with an excess of alkaline earth hydroxide, the amount of alkaline earth arsenate in the resultant product being smaller than of lead arsenate.

5. The method of making an insecticide which consists in reacting between a suitable lead salt and an excess of arsenic acid, and neutralizing the residual acid with magnesium hydrate, the amount of magnesium arsenate in the resultant product being smaller than of lead arsenate.

6. The method of making an insecticide which consists in reacting between a suitable lead salt and an excess of arsenic acid, and neutralizing the residual acid with an excess of magnesium hydrate, the amount of magnesium arsenate in the resultant product being smaller than of lead arsenate.

Signed by me, this 3rd day of February, 1919.

HERBERT H. DOW.